Aug. 16, 1932.  W. E. MILLER  1,872,488
WRAPPING MACHINE
Filed April 1, 1929   7 Sheets-Sheet 1

Fig. 3.

Aug. 16, 1932.  W. E. MILLER  1,872,488
WRAPPING MACHINE
Filed April 1, 1929   7 Sheets-Sheet 5

Fig. 6

Inventor
William E. Miller
By Liverance and
Van Antwerp
Attorneys

Inventor
William E. Miller

Patented Aug. 16, 1932

1,872,488

UNITED STATES PATENT OFFICE

WILLIAM E. MILLER, OF GOBLES, MICHIGAN

WRAPPING MACHINE

Application filed April 1, 1929. Serial No. 351,601.

This invention relates to bread or carton wrapping machines and is more particularly concerned with a relatively small machine, semi-automatic in character, by means of which loaves of bread, or cartons, having a general shape similar to the shape of bread loaves may be expeditiously wrapped and sealed, use being made of the usual waxed paper for wrapping purposes.

In many instances the size of an establishment which can use a wrapping machine is not large enough to warrant the expenditure of large sums of money for a full automatic wrapping machine. If the business is not sufficient to keep the same active during all business hours there is lack of economy when a very expensive machine is idle with increase in interset charges and overhead for floor space and the like. The machine which I have invented occupies comparatively small space and may be manufactured and sold for much less than the larger automatic machines but with it, an active and experienced operator is able to wrap and seal nearly as many loaves of bread or cartons as is possible with the larger and much more expensive full automatic machine.

My invention consists in a very novel organization and combination of operating parts for effectively attaining the ends stated, said machine being readily capable of adjustment for different lengths of loaves or cartons and for different sizes thereof, together with the utilization of power operated mechanism in the machine for effecting the automatic function thereof, said machine being tripped by the operator each time that the loaf of bread or carton is to be wrapped and sealed.

A full understanding of the invention and the embodiment thereof which I have produced may be had from the following description, taken in connection with the accompanying drawings, in which.

Like reference characters refer to like parts in the different figures of the drawings.

Figure 7:
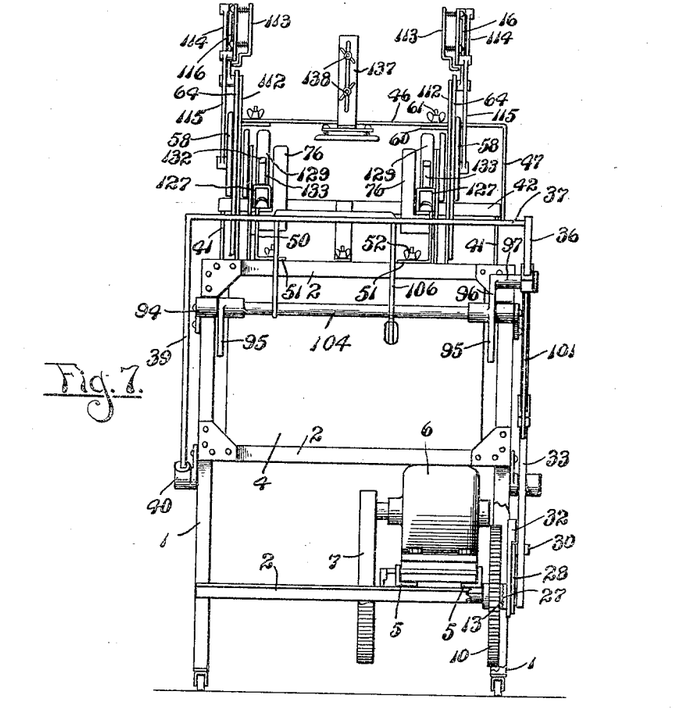
Fig. 7 is a front elevation of the machine.

In the construction of the machine, a supporting frame of rectangular outline is provided having four corner posts 1 of angle iron connected at the front and rear of the machine by horizontal angle bars 2 and at the sides by other angle bars 3 to make a light and rigid frame, which, at its upper portion may be enclosed by front, back and side vertical plates 4 of sheet metal. A distance above the lower ends of the posts 1 are two spaced apart angles carried at their ends by the lowermost angle bars 2, as shown in Fig. 7, which serve as supports for the electric motor and the power mechanism driven thereby.

Figures 8, 9:
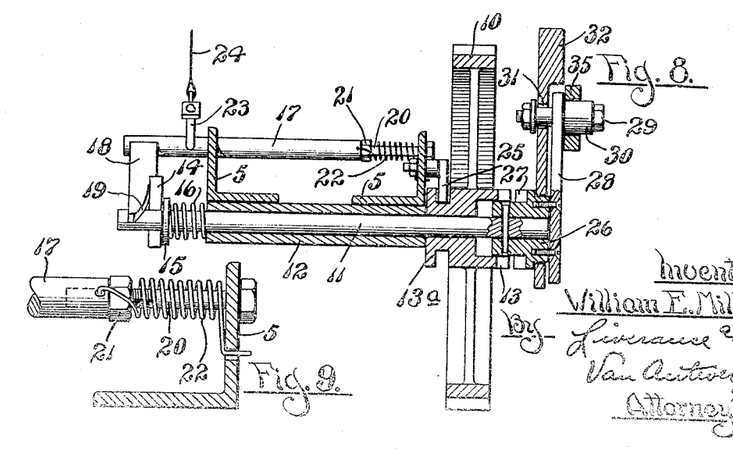
Fig. 8 is an enlarged transverse section illustrative of the mechanism for driving the machine to make one cycle of operations thereof and thereafter stopping until again tripped.
Fig. 9 is a fragmentary enlarged detail in elevation and vertical section of the mechanism shown in Fig. 8.

The electric motor 6 is supported by the bars 5 and, through a belt 7, drives a wheel 8 fixed at one end of a horizontal shaft 8a rotatably mounted and carried in suitable bearings below the bars 5. At its outer end (Figs. 1 and 10) the shaft carries a pinion 9 meshing with a gear 10, the hub of which is loosely mounted on a horizontal shaft 11, in turn rotatably mounted in and extending through a horizontal bearing sleeve 12 below and attached to the bars 5. The outer end of the hub of the gear 10 is recessed, as shown in Fig. 8, and formed with a clutch face 13, while the inner end of the hub is grooved to form an integral collar, as indicated at 13a, the purpose of which will hereafter appear.

The inner end portion of the shaft 11 is equipped with a washer 15 between which and the inner end of sleeve 12, a coiled compression spring 16 around the shaft is located. The washer 15 is placed against a finger or bar 14 extending thru the shaft 11 (see Fig. 8). A rock shaft 17 is mounted for rocking movement on and between the upwardly extending flanges of the bars 5, and its inner end is equipped with a radially extending arm 18, the edge portion of which, near its free end, is formed as a curved cam 19, against which the finger or bar 14 may bear when the parts are in the position shown in Fig. 8. The rod 17 at its outer end is connected with an alined bolt 20, threaded into its end and passing through the flange of the outer angle bar 5, a lock nut 21 being used to positively secure the rod 17 and bolt 20 in any position to which they may be adjusted with respect to each other. This construction is for the purpose of getting the proper adjustment of the arm 18 and the finger 14 with respect to each other. A coiled torsion spring is located around the bolt 20 one end being secured to the rod 17 and the other to the vertical flange of the outer angle bar 5, the tendency of which is to turn the rod 17 so as to bring the end of finger 18 against the inner end portion of the shaft 11.

A rod 23 is secured to the rock shaft 17 extending radially therefrom, to which a trip cable 24 is secured. The means for manually pulling on the cable 24 will hereafter be described. It is evident, however, that on pulling on the cable 24 and drawing it in an upward direction the arm 18 is turned to disassociate it from the finger 14 and release the spring 16, whereupon the shaft 11 will be moved longitudinally inward for a short distance.

A retaining plate 25 is secured to the vertical frame of the outer angle bar 5 and extends into the groove of the hub or gear 10, insuring that the gear will not move in the direction of the length of the shaft 11. A head 26 has a permanent connection to the outer end portion of the shaft 11 and extends into the recessed outer end of the hub or gear 10 and is formed with a clutch face 27 in complementary relation to the clutch face 13 on the gear hub, as previously described; and it is evident that when the shaft 11 is moved longitudinally inward under the influence of spring 16, the two clutch faces 13 and 27 are brought together and the shaft 11 rotated, inasmuch as the gear 10 is continuously rotating at all times that the motor 6 is in operation.

An arm 28 is permanently secured to and extends radially from the outer end of the head 26. Adjacent its outer end a bolt 29 passes therethrough, serving to mount a roller 30 at the outer side of the arm 28, while said bolt passes through a smaller roller at the opposite side of the arm 28 which extends through slot 31 in a weighted sector member 32 loosely mounted around the head 26.

Figures 1, 10:
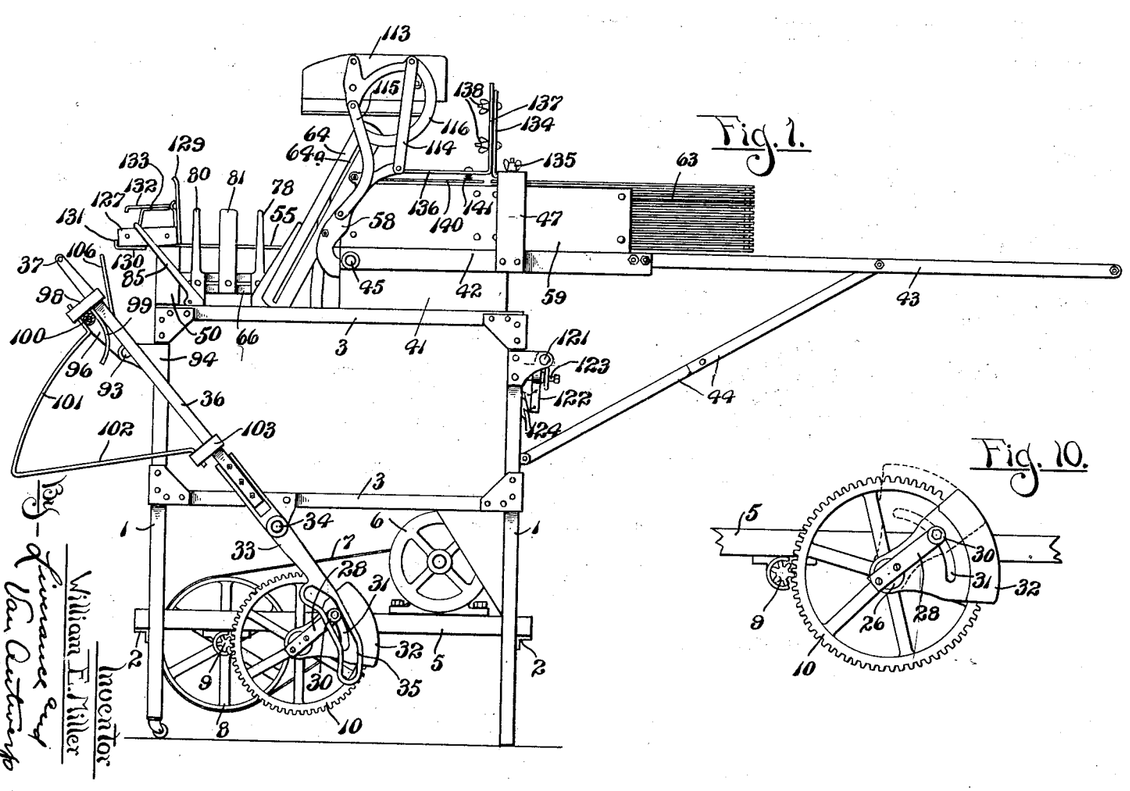
Fig. 1 is a side elevation of the machine of my inventnion.
Fig. 10 is a fragmentary elevation of the construction shown in Fig. 8.
Figure 2:
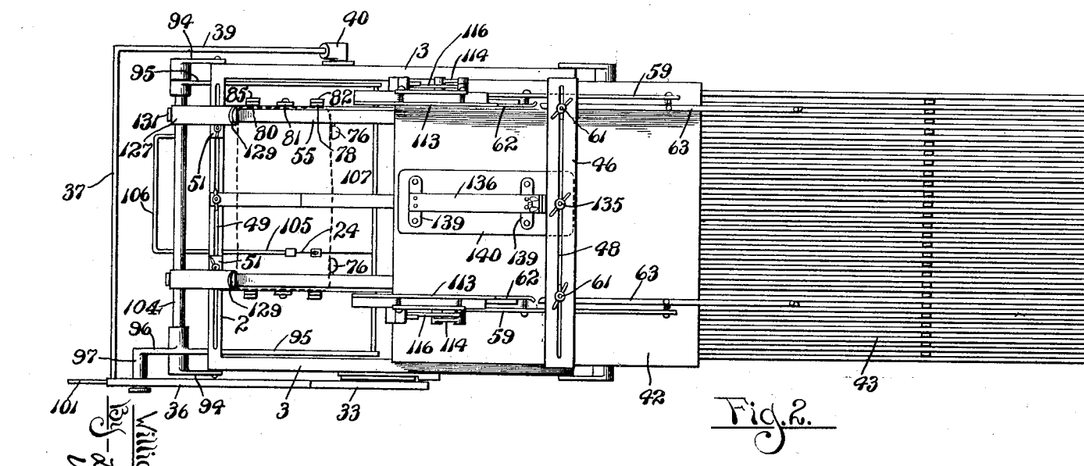
Fig. 2 is a plan view thereof.

A lever 33 is pivotally mounted between its ends, at 34, on one of the frame members 3 of the machine, as shown in Fig. 1, and at its lower end is provided with a slotted portion, shown at 35 in Fig. 1, the roller 30 extending into the slot. A bar 36 is secured to the upper end of the lever 33 and extends upwardly and forwardly to the front of the machine. At its upper end a horizontal rod 37 is secured which extends across in front of the machine to the opposite side and is then extended downwardly and inwardly, as indicated at 39 (Fig. 7) and connected to a collar 40 mounted for pivotal movement on a pivot on the machine in direct axial alinement with the pivot 34, (Fig. 1) previously described.

It is evident that when the trip cable or rope 24 is pulled, with the consequent inward longitudinal movement of the shaft 11, the connection of the clutch faces 13 and 27 causes the shaft 11 to be rotated. The arm 28 turns with the head 26 and thereupon oscillates the lever 33 and the parts connected therewith about the pivotal axis of the pivot 34. The shaft 11 makes one complete revolution and is then automatically stopped due to the finger 14 coming against the inclined cam edge 19 of arm 18 and being forced, by reason of the shape of said cam edge, in a direction to move the shaft 11 longitudinally outward with a compression of spring 16 and an automatic disconnection of clutch faces 13 and 27. The weighted sector 32 is of value in that the momentum which it accumulates during the rotation of the shaft will give an impulse to the shaft 11 to turn it to the exact position from which it started and bring finger 14 against a stop shoulder on the arm 18 if, by reason of the friction of finger 14 on the cam edge 19 coupled with the resistance to disconnection of clutch faces 13 and 27, there should be a tendency for the parts to stop when the clutch faces were barely separated yet sufficiently near to cause a danger of one clutch connection with the other when it was not desired.

Figure 6:
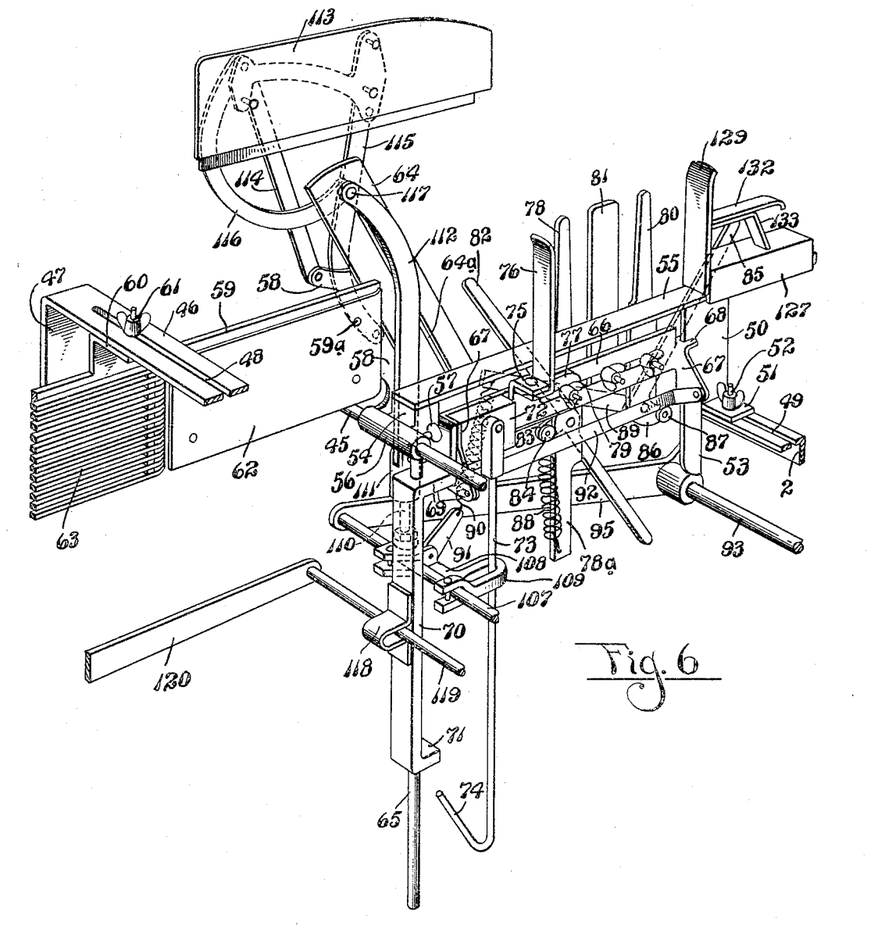
Fig. 6 is a fragmentary perspective view showing the essential elements of the automatic wrapping construction which are mounted at each side of the machine, so as to engage with the wrapper at each end of the article which is to be wrapped.

At the upper end and at each side of the supporting frame and near the back thereof a vertical plate 41 (see Fig. 1) is attached to the frame. The two plates serve to support a horizontal metal table 42 having downwardly extending flanges at its sides, to the rear end of which a plurality of spaced apart bars 43 are pivotally connected, being adapted to be held in horizontal position by folding braces 44. A rod 45 extends horizontally across between the plates 41 adjacent their front upper corners. A flat bar 46 provided with downwardly turned vertical ends 47 is secured to the table 42, substantially midway between its ends, the horizontal bar 46 being slotted lengthwise, as indicated at 48. The horizontal inwardly extending flange of the front upper cross bar 2 of the supporting frame is likewise horizontally slotted, as at 49, (Fig. 6). The front slotted bar 2, the rod 45 and the bar 46 serve as supports upon which the wrapper folding devices of the machine are mounted. These folding devices are positioned one at each side of the machine and are adjustable toward each other. In practice one at one side of the machine will be maintained in a fixed position and the other at the other side may be adjusted toward or away from it for different lengths of loaves or cartons which are to be wrapped, and the ends of the wrappers folded and sealed. A description of said end folding devices at one side of the machine will serve for that at the other side.

In the construction of the folding mechanism at each side of the machine (see Fig. 6) a vertical plate 50 is provided with a laterally offset foot 51 to bear upon the upper side of the front supporting bar 2, a bolt 52 with a thumb nut serving to adjustably connect the supporting plate 50 to the bar. Back of the bar 2, the plate is continued downwardly to form a guide finger 53. Back of the plate 50 is a bracket 54 between the upper side of which and the upper end of the plate 50 a flat horizontal bar 55 is disposed and is permanently secured. The bracket 54 is provided with a sleeve 56 through which the rod 45 passes. The sleeve is adjustably mounted on the rod but may be held by a set screw 57 in any position to which adjusted.

Integral with the bracket 54 there is formed an upwardly and rearwardly extending irregularly shaped arm 58 (Figs. 1 and 6) to which a vertical plate 59 is secured at its front end, extending to the rear underneath the slotted bar 46, and having, at its upper edge, an upwardly extending and laterally turned foot 60 through which and the slot 48 of the bar a clamping bolt 61 extends, equipped with a thumb nut at its upper end, as shown in Fig. 6. It is evident that by loosening the bolt at 52, the set screw at 57 and the clamping bolt 61, the parts supported by the bar 2, rod 45, and bar 46 may be adjusted inwardly or outwardly as may be desired, so as to bring the devices, one at each side of the machine, toward each other, or space them wider apart, as may be necessitated by the length of the loaves or cartons which are to be wrapped.

On the inner side of the plate 59 and at its front portion is a spaced vertically positioned heated plate 62, behind which are suitable heating coils (not shown) and back thereof in substantially vertical alinement therewith are a plurality of spaced apart horizontal bars 63 located vertically over each other, which extend partly over the horizontal bars 43 previously described. An upwardly and rearwardly inclined guide plate 64 having a longitudinal slot 64a cut therein is permanently secured to each arm 58 lying at the front and outside of the front end of the plate 59, as shown in Figs. 1 and 6. A rod 65 is permanently secured at its upper end to the lower side of the bracket 54 extending downwardly therefrom.

Underneath the horizontal bar 55, previously described, a longitudinally slotted vertically positioned plate 66 is located, having inwardly turned ends 67, the front end being formed with spaced apart guide fingers 68 passing one to each side of the vertical plate 50. The rear end 67 is permanently secured to an angular shaped bracket 69 having a horizontal portion through which the rod 65 passes, the bracket then being continued downward in a bar 70 and terminating at its lower end in a forwardly extending lip 71 directly below the horizontal portion of the bracket 69 and through which the rod 65 also passes. A block 72 is secured at the inner side of the rear part of the plate 66 directly in front of the rear end 67 from which, at its inner side, a rod 73 is pivotally suspended formed with upwardly and rearwardly extending hook 74 at its lower end, a short distance below the lip 71.

In front of the block 72 at the inner side of the plate 66 a vertical finger 76 is positioned, attached at its lower end to an inwardly turned horizontal ear 75 at the upper end of a slotted plate 77 lying against the inner side of the plate 66 and adjustably mounted thereon by means of a bolt and thumb nut, whereby the fingers 76 may be moved from front to rear and vice versa for the purpose of conforming to different widths of loaves or cartons, as will hereafter appear. The finger 76 is located at the inner edge of the bar 55 in a vertical plane transverse to the length of said bar.

A vertical finger 78 is located at the outer edge of the bar 55 in a vertical plane parallel to the length of said bar and has a lower part 78a extending below the bar 66 on which it is adjustably mounted for movement toward or away from the front of the machine. The slot 79, made lengthwise of the bar 66, permits a shifting of the clamping bolts used, as is evident. Two other vertical fingers 80 and 81, the latter being positioned between the fingers 78 and 80, are similarly adjustably mounted on the bar 66, the three fingers 78, 80 and 81 being positioned in the same vertical plane and extending above the bar 55 at the outer edge thereof. The finger 80 likewise extends a distance below the bar 66, to which it is adjustably connected. The fingers 78, 81 and 80 may be termed stationary fingers.

A movable folding finger 82 is pivotally mounted on the finger 78 below the bar 66 and has a laterally extending arm 83 at its lower end, carrying a roller 84. A second folding finger 85 is pivotally mounted adjacent its lower end on the lower end of the fixed finger 80 and below the bar 66 and it likewise has a laterally extending arm 86 at its lower end which carries a roller 87. A coiled tension spring 88 is attached at its lower end to the lower end of the extension 78a of finger 78 and at its upper end to the arm 83, the normal tendency of the spring being to turn the arm 82 in a counter clockwise direction, referring to Fig. 6. A bar 89 is connected to the pivotally mounted finger 85 and extends upwardly and to the rear. It has one end of a coiled tension spring 90 attached thereto, the other end of said spring being attached to a finger 91 mounted on a movable operating portion of the machine, as will later be described.

A U-shaped stirrup 92 is pivotally mounted between the ends 67 of the plate 66 and includes a horizontal bar connecting the legs of the stirrup, which bar passes above the roller 87 and below the roller 83, it being evident that the fingers 78 and 80 may be adjusted to different positions lengthwise of the plate 66, yet the rollers 84 and 87 will bear upon said horizontal bar in any position of adjustment.

A rock shaft 93 extends across the front of the machine being mounted at its ends in suitable brackets 94. Two arms 95 are mounted on the shaft and extend to the rear alongside the side plates 4 of the machine. One of said arms at one side of the machine is continued upwardly and to the front making a second arm 96, at the free end of which is a laterally extending rod or crank 97 adapted to normally extend in front of the bar 36 directly below a member 98 attached to said bar 36, and in front of a downwardly and outwardly curved shoe 99 attached to said bar, as shown in Fig. 1. The rod 97 is normally held between said shoe 99 and the upturned end 100 of an irregularly shaped guide bracket which comprises an arc shaped section 101, formed in the arc of a circle having a center at the pivotal axis of the pin 34, from the lower end of which another section 102 extends inwardly toward and is connected, by a suitable securing fixture 103, to the bar 36.

Figure 11:
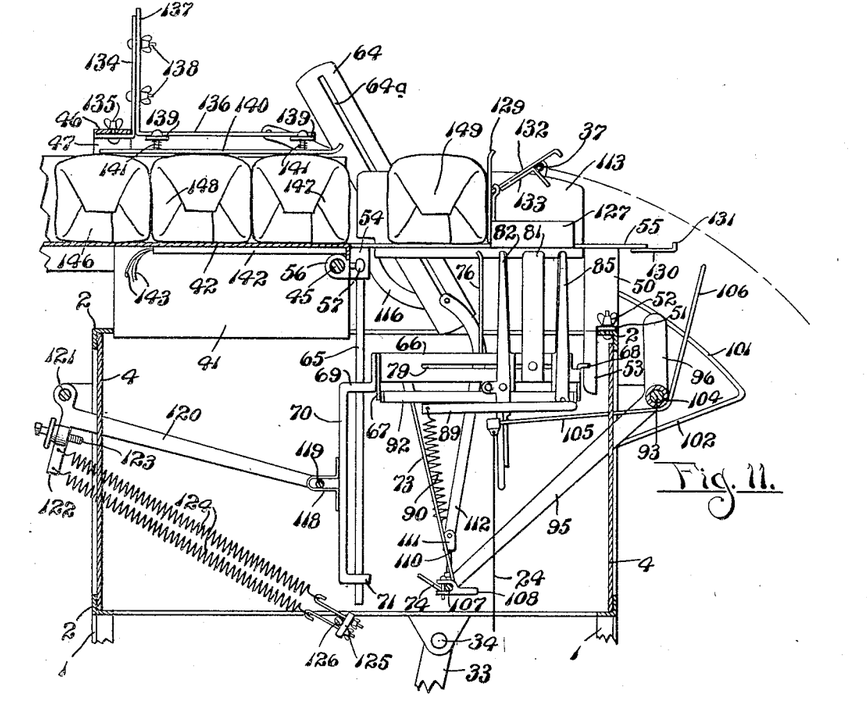
Fig. 11 is a view similar to that shown in Figs. 5 and 6, showing the position of the parts at the completion of a bread wrapping operation and the automatic movement of the wrapped loaf or carton to the rear into conjunction with the heating plates which seal the wrapper, and, Figs. 12 to 15, inclusive, illustrate in succession the respective steps in wrapping.

With this construction when the bar 36 is turned to the rear at its upper portion about the pivot 34, there is a simultaneous rocking movement imparted to the shaft 93, which continues until the rod 97 is withdrawn from between bar 36 and the end portion 100, after which the bar 36 may continue its movement, the arc shaped section 101 passing over the rod 97, as shown in Fig. 11, the arc shaped section 101 merely rides against the rod 97 and prevents the arms 95 from returning upwardly. These arms maintain both the fixed and movable fingers in their lower position whereby the loaf of bread may be pushed along to its next position adjacent the side and bottom heating devices.

A sleeve 104 is loosely mounted on the rock shaft 93 to which a trip member is permanently secured, as by welding, including a rearwardly extending arm 105 with which the upper end of the trip cable 24 is connected, and an outer vertically extending loop 106 located in a position for ready access by the operator of the machine to operate the trip.

A horizontal rod 107 extends between the rear ends of the arms 95 described on which a fixture 108 is carried having a forwardly extending guide loop 109 for the passage of the previously described depending rod 73. The finger 91 to which the lower end of spring 90 is attached, as previously described, is also mounted on the fixture 108 (Fig. 6). A vertical short rod or post 110 is secured to said fixture and extends upwardly therefrom, having a head 111 at its upper end to which the lower end of a substantially vertical link 112 is pivotally connected. It is, of course, to be understood that the structure being described is duplicated at each side of the machine and that the links 112 at their upper end portions pass inside of the guide plates 64, the upper end portions of the links 112 being curved somewhat to the rear and their ends coming directly opposite the guide slots 64a.

An end folding plate 113 is carried by two links 114 and 115 on each arm 58, the links being pivotally connected at their ends to the plates 113 and the arms 58. The arm 58, see Fig. 1, is pivotally mounted upon the supporting shaft 45. A link 116 of semi-circular form is pivotally connected at one end on the same pivot used to connect the upper end of the link 114 to its plate 113, and at its other end is pivotally connected by a stud 117 which passes through the guide slot 64a of the adjacent guide plates 64 (Fig. 6), whereby on downward movement of the links 112, the studs 117 traverse the slots 64a and move the plates 113 in a forward and downward direction without changing the vertical position of the plates during such movement.

Figure 3:
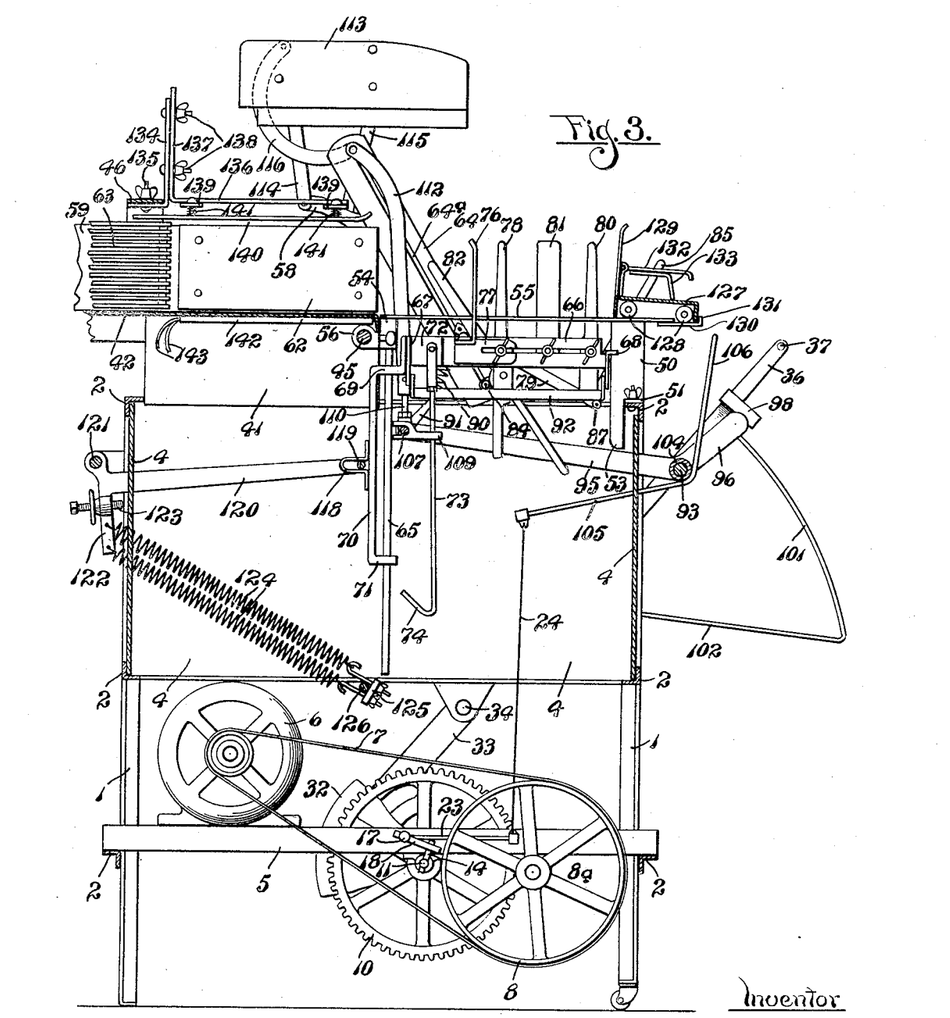
Fig. 3 is a vertical transverse section through the operative part of the machine, illustrating the position of the parts before a loaf of bread or carton has been placed therein and the mechanism tripped.

At the back of the bars 70, U-shaped loops or stirrups 118 are permanently secured. A horizontal rod 119 passes through the loops and at its ends is connected to levers 120 which extend to the rear through the back plate 4 and are pivotally mounted at 121 on suitable brackets. At the rear end of lever 120 (Fig. 3) it is provided with a downwardly extending arm 122 through which an adjusting screw 123 passes to bear against a rear post of the frame, while coiled compression springs 124 are attached at one end to the arm 122, extend downwardly and forwardly and, through a connecting fixture 125, are attached to a fixed cross rod 126 (Fig. 3). The springs 124 under tension serve to normally elevate the levers 120 until stopped by the stop screws 123 and hold the bars 70 and the attached parts in an upper position.

At the front of each bar 55 a roller carriage 127 mounted on rollers 128 is mounted for movement over the bars. This carriage at its rear end has an upwardly extending finger 129 located in a vertical plane parallel to the plane of the finger 76. Each flat bar 55 at its front end has a short extension bar 130 attached thereto at its lower side and extending in front thereof provided with an upturned lip 131 at its front end so that the front or outermost roller of the carriage 127 drops into the recess formed and serves to hold the carriage against aimless movement to the rear. A metal wing 132 is pivotally mounted on the front side of the finger 129 normally occupying a horizontal position and resting upon a support 133 connected to it. When the bar 36 is moved to the rear carrying the cross rod 37 with it, said rod passes underneath the wing 132 turning it upwardly with the attached member 133, as in Fig. 11, whereby the roller carriage is moved to the rear over the bar 55.

Between the ends of the slotted bar 46 a vertical flat post 134 is adjustably secured by means of a clamping bolt 135, so that it may be shifted to different positions in the length of bar 46, on which a spring actuated presser plate is carried. A bracket for carrying the plate is attached to the post 134 including a vertical section 137 adjustably clamped by clamping bolts 138 on the post, which is slotted to permit vertical adjustment, and having a horizontal section 136 extending forward over the table 42. Cross bars 139 are attached to the under side of the section 136 from which the presser plate 140 is suspended by pins 141 with relatively light compressing springs around them, the tendency of which is to move the plate 140 downwardly as far as it will go. The plates 62 and bars 63 are also yieldably mounted in the same manner. As previously stated, the plates 62 are heated by electric heating coils (not shown) between the same and plates 59. The front portion of the table 42 is likewise heated by suitable heating element located as indicated at 142 (Fig. 3) the circuit wires 143 leading thereto.

Figures 12, 13, 14, 15:
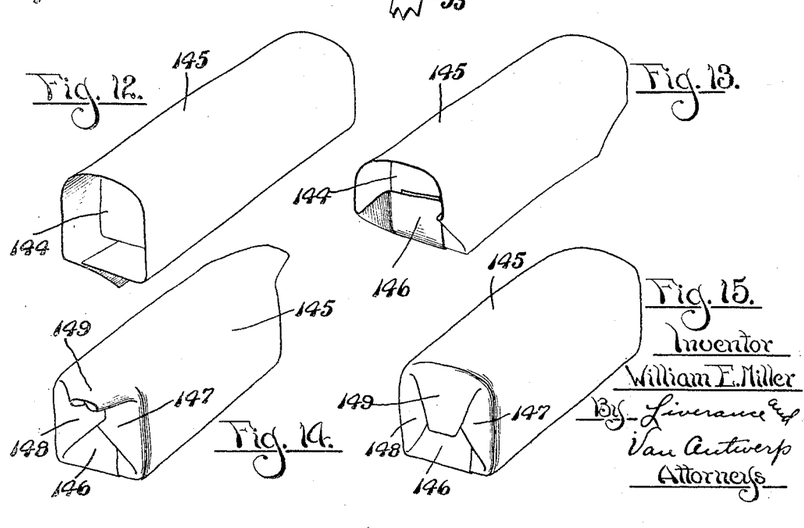
Fig. 12 illustrating that part of the wrapping which is first performed by hand.
Fig. 13 that part performed when the loaf or carton and the wrapper are introduced into the machine.
Figs. 14 and 15 the successive automatic steps of wrapping performed by the machine to completely close the ends of the article wrapped.

In operation the loaf or carton 144 is placed in the machine after a wrapper 145 has been rolled around the same longitudinally, as shown in Fig. 12. This part of the wrapping, that is the rolling of the loaf or carton in the wrapper 145 is performed on a table distinct from the machine, even though it may be attached thereto at one side, and the ends of the wrapper extend a distance beyond the ends of the loaf or carton. The loaf or carton with the wrapper, as shown in Fig. 12, that is, with the free edges of the wrapper overlapping at the underside, is placed in the machine with the parts in the position shown in Fig. 4; and when it is placed in the machine the relative fixed fingers 78, 81 and 80 at each end of the loaf or carton engage against the projecting end portions of the lower side of the wrapper and turn the same upwardly at each end forming the first fold, as indicated at 146 in Fig. 13.

So far there has been no operation of the machine and the rolling of the loaf or carton in the wrapper and placing it in the machine between the relatively fixed fingers 78, 81 and 80 is a manual operation. Following the placing of the loaf or carton with the wrapper on it in the machine, as described, the trip is operated by engaging the member 106 and pulling outwardly thereon, whereupon the clutch faces 13 and 27 are automatically engaged and the shaft 11 turned through one complete revolution, with a consequent movement of the cross rod 37 from its forward position, shown in Fig. 3, to the rear and back again to its first position.

During the first portion of said movement, shaft 93 is rocked, the arms 95 moved downwardly with a stretching of the springs 90, which acting on the bars 89 turn the fingers 85 from their inclined forward position (as in Fig. 6) to a vertical position. As a consequence of such movement the rollers 87 are elevated, turning the stirrups 92 upwardly, which being below the rollers 84 elevates them and turns the fingers 82 from rear inclined position (as in Fig. 6) to a vertical position, the fingers 85 and 82 folding the projecting portions of the wrapper at each side against the first folds 146, or completes the wrapping of the loaf or carton to the stage shown in Fig. 14, wherein the two side flaps 147 and 148 have been turned against the end of the loaf or carton, leaving only an outwardly projecting flap 149 at each end of the loaf or carton, which has not been folded against the end of the loaf or carton.

Figure 5:
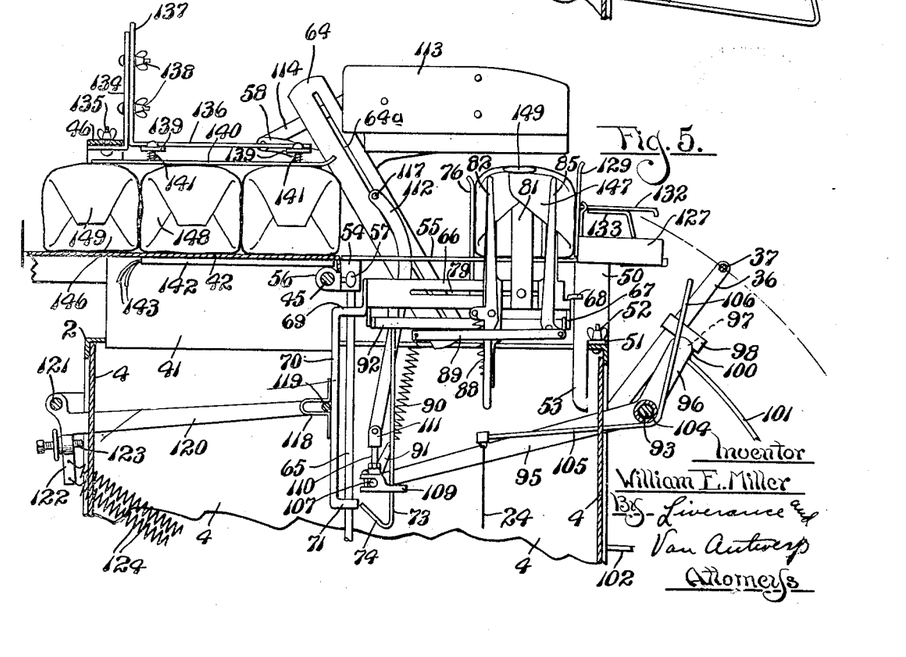
Fig. 5 is a similar fragmentary section illustrating a further step in movement of the mechanism in the wrapping operation of the machine.

When the fingers 82 and 85 have performed their function the rod 107 will have about reached the hooks 74 of the depending rods 73, as in Fig. 5. Continuation of the downward movement of the arms 95 and the rod 107 carried thereby brings said rod into the hooks 74 and the downward movement of the rod 107 thereafter will carry with it the depending hook rods 73 so as to move the plates 66 and the various relatively fixed and movable fingers 78, 81 and 80 and 82 and 85 downwardly with it, moving them below the upper sides of the bars 55 on which the loaf or carton and its wrapper are placed when introduced into the machine, also the back fingers 76 will be moved downwardly below the bars 55.

Figure 4:
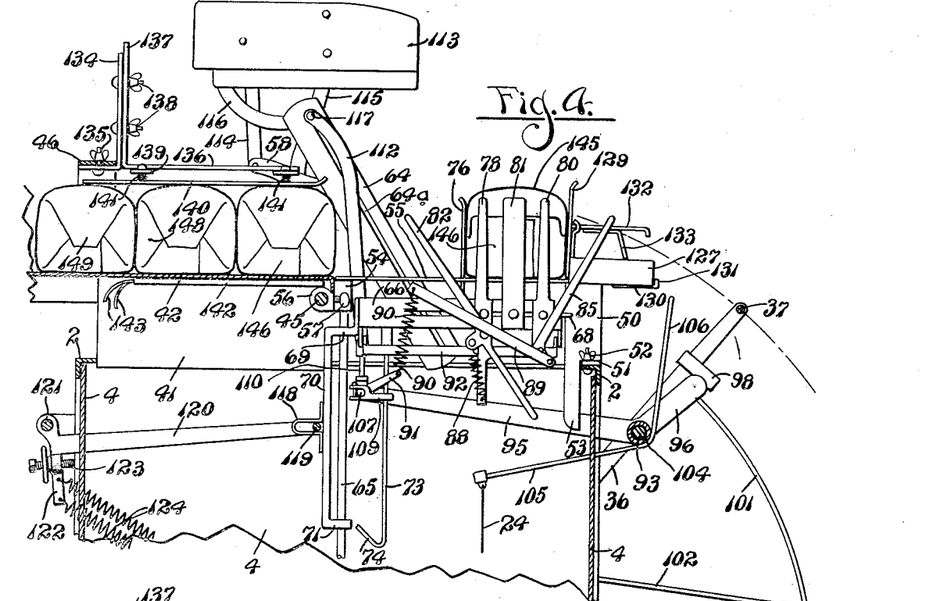
Fig. 4 is a similar fragmentary vertical section from front to rear of the machine, illustrating the parts in a similar position to that shown in Fig. 3 and with a loaf or carton and its wrapper having been placed in the machine for the succeeding automatic operations.

During the first stage of movement of the rod 107 the links 112 have also been moved downwardly a part of their travel to bring the plates 113 from the position shown in Fig. 4 to that shown in Fig. 5, or with the lower edges of the plates a short distance above said several fingers. The continuation of the downward movement of rod 107, after the same has engaged with the hooks 74, causes a continuation of the downward movement of the plates 113, which follow the withdrawal of the several fingers and turn the upper flaps 149 downwardly over the other flaps and against the ends of the loaf or carton, as shown in Fig. 15. When all this has been completed the bar 36 has moved to the rear to the position where the laterally extending rod 97 on the arm 96 is ready to disengage from between the part 100 and the rear edge of said bar 36, so that the bar 36 and the cross rod 37 may thereafter continue their rearward movement, while the arms 95 with the rod 107 carried thereby are held in the down position shown in Fig. 11 during all the time that the cross bar 37 is continuing its rearward movement and until it returns again to the position where the front edge of bar 36 will engage the lateral rod 97 for returning the parts to initial position.

The continued rearward movement of cross rod 37 brings the same into the angle between the members 132 and 133, causing the same to turn upwardly and then move the roller carriage 137 with the front fingers 129 attached thereto rearwardly, pushing the completely wrapped loaf or carton to the rear over the plates 55 and on to the heated table 42 and between the heated end plates 62, the loaves or cartons passing underneath the presser plate 140. This is illustrated in Fig. 11. The ends of the wrapper are kept from unfolding by the end folding plates 113 until they have passed to the plates 62. The waxed paper is heated at its ends and at the bottom and a seal is made which holds the wrapper in completely folded and sealed condition. The loaves or cartons are periodically moved back over the table 42 as additional loaves or cartons are wrapped, and finally pass between the end cooling bars 63 and over the horizontal bars 43 between which air has access to the wrappers to cool the same and permit the wax to harden so that the seal made will not be broken.

The return movement of the oscillating bar 37 to its initial position returns the arms 95 to upper position, releasing the mechanism which is returned to upper position under the influence of the springs 124 as soon as the rod 107 disengages from the hook 74, while the mechanism for operating the end plates 113 is directly connected with the rod 107 and moves upwardly therewith. During the initial part of the return movement of the bar 37 engagement occurs with the down turned lip on the member 132 thus withdrawing the ejector 129 to its inoperative position. The upturned lip 131 on the short extension bar 130 limits the return travel of the ejector. The machine is then ready to receive another loaf or carton rolled in a wrapper, as in Fig. 12, for a succeeding cycle of operations of the machine, which follows as soon as the trip is again manually operated.

The machine described is a very practical and efficient machine for obtaining the objects stated. It has all of the necessary capacity of adjustment for different lengths, widths and heights of loaves or cartons within the range of the machine and with it the loaves or cartons may be very quickly and expeditiously wrapped. An operator familiar with the machine is able to wrap very nearly, if not quite as many, loaves or cartons as may be done on many of the large full automatic machines. The construction has been thoroughly tested and tried out in practice and has been sold to and is being used by the public. The invention is defined in the appended claims and is to be considered comprehensive of all forms of structure coming within their scope.

I claim:

1. In a wrapping machine, the combination of a horizontal support on which an article to be wrapped with a wrapper rolled lengthwise of and around the same may be placed, fingers extending upwardly at the ends of said support to turn the lower projecting end portions of said wrapper upwardly when the article with the wrapper around it is placed on the support, pivotally mounted fingers at each side of the first mentioned fingers, means for operating the pivotally mounted fingers inwardly toward each other to fold the sides of the projecting ends of the wrapper, means for lowering all of said fingers, and means mounted above and back of said support simultaneously moved in a downward direction with the downward movement of said fingers to complete the folding of the wrapper at its projecting ends and at the upper sides thereof.

2. In a wrapping machine, a horizontal support upon which an article to be wrapped with a wrapper rolled lengthwise around the same may be placed, the ends of the wrapper projecting beyond the ends of said article, fingers extending upwardly from the ends of the support to fold the lower sides of the projecting ends of said wrapper upwardly, pivotally mounted fingers one at each side of the first fingers, means for moving said pivotally mounted fingers inwardly toward each other to fold the sides of the projecting ends of the wrapper inwardly, means for withdrawing all of said fingers in a downward direction, plates one at each side of the support and above the same, means for moving said plates downwardly to follow the downward withdrawal of said fingers and to fold the upper sides of the projecting end portions of the wrapper in a downward direction, and means for moving the wrapped article to the rear over said support.

3. In a wrapping machine, a horizontal support on which an article having a wrapper rolled lengthwise around the same and with end portions of said wrapper projecting beyond the ends of the article may be placed, locating devices for said article and wrapper extending above said support against which the rear side of the article is adapted to be placed, fingers extending upwardly from each end of the support to fold the lower side of the projecting ends of the wrapper against the ends of the article when said article with wrapper around it is placed on the support, pivotally mounted fingers one at each side of the first mentioned fingers, means for moving said pivotally mounted fingers inwardly toward each other to fold the sides of the projecting ends of the wrapper against the ends of the article, means for simultaneously moving said locating devices and all of said fingers downward, means for simultaneously folding the upper sides of the projecting ends of the wrapper in a downward direction against the ends of said article, devices mounted on said support for movement to the rear against the rear ends of which said article bears at its front side, and means for moving said devices to the rear after the projecting ends of the wrapper have been folded to move the wrapped article rearwardly off the support.

4. In a wrapping machine, a horizontal support on to which a loaf, carton, or similarly shaped article having a wrapper with projecting end portions rolled longitudinally around the article may be placed, fingers extending upwardly above said support at each end thereof to engage with the under side of the projecting end portions of the wrapper and fold the same upwardly against the end of the article, means for thereafter folding the side portions of the projecting ends of said wrapper inwardly against the ends of the article, means for retracting said fingers and side folding means downwardly, means for simultaneously folding the upper sides of the projecting end portions of the wrapper in a downward direction against the ends of the wrapper, a horizontal oscillating rod, means for moving said rod to the rear and back to initial position, and devices at the front of the wrapped article movably mounted on the support with which said rod engages, whereby said devices are moved to the rear to thereby carry the wrapped article over and off said support.

5. A construction containing the elements in combination defined in claim 4, combined with an electric motor, mechanism interposed between said motor and the oscillating rod to move from front to rear and vice versa, said mechanism being normally disconnected from the motor, trip means for connecting the motor with said mechanism, and means for disconnecting the motor from said mechanism when the rod is moved from front to rear and back to its initial position.

6. A wrapping machine comprising, a horizontal support on which an elongated article substantially rectangular in cross section with a wrapper rolled around the same longitudinally and having projecting end portions may be placed, fingers extending upwardly from the ends of said support to engage with the under side of the projecting end portions of said wrapper to turn the same upwardly against the ends of the article when the same with the wrapper is placed on the support, locating devices extending above said support against which the rear side of the article is placed, pivotally mounted fingers one at each side of the first mentioned fingers, a vertically movable plate at each end of the support on which all of the fingers at an end of the support are mounted, means normally holding said plates in an upper position, operating means connected with said pivotally mounted fingers for turning the same inwardly toward each other to fold the sides of the projecting ends of the wrapper inwardly against the ends of the article, said operating means moving in a downward direction, means on said plates engaged by said operating means after the same has moved downwardly a predetermined distance, whereby said plates and attached fingers and locating means are all moved in a downward direction, and means connected with said operating means to move in a downward and forward direction therewith for folding the upper sides of the projecting ends of the wrapper against the ends of said articles simultaneously with the downward movement of said plates.

7. In a wrapping machine, a horizontal support on which an elongated article substantially rectangular in cross section with a wrapper positioned lengthwise and rolled around the same and having the free end portions of the wrapper extending beyond the ends of said article may be placed, fingers extending upwardly at the ends of the support to engage with and hold the lower sides of the projecting ends of said wrapper upwardly against the ends of the article when it is placed on said support, pivotally mounted fingers mounted one at each side of the first fingers adapted to be swung inwardly toward each other and hold the sides of the projecting ends of the wrapper inwardly against said article, plates mounted for vertical sliding movement one below each end of the support to which all of the fingers at an end of the support are connected, a rock shaft mounted for movement about a horizontal axis, arms extending from said rock shaft under said plates, a rod connecting the inner ends of the arms, means connecting said rod with the pivotally mounted fingers to turn said fingers inward on downward movement of said arms, hooks depending from said plates engaged by said rod when the arms have moved a predetermined distance downwardly, thereby drawing all of said fingers in a downward direction, and means for folding the upper sides of the projecting end portions of the wrapper in a downward direction against the ends of said article operatively connected with said rod, whereby said last mentioned folding means is brought to and immediately above the upper ends of said fingers and follows the same downwardly as they are withdrawn in a downward direction.

8. A construction containing the elements in combination defined in claim 7, combined with a lever mounted for oscillating movement about a horizontal axis and extending upwardly and forwardly to the front of said support, a horizontal rod attached to the upper end of said lever, mechanism for oscillating the lever about its pivot to move the rod from front to rear and vice versa, an electric motor, trip means for connecting said electric motor with said lever driving mechanism, means for disconnecting the motor from said driving mechanism when the rod has made a movement from front to rear and back to initial position, devices mounted on said support to move thereover with which said rod engages after the folding operations on the projecting end portions of the wrapper have been performed to move the wrapped article to the rear and off of said support, and means connecting said oscillating lever with the rock shaft to rock the same when the lever is oscillated.

9. In a machine of the class described, a supporting frame, horizontal bars one adjacent each side of the frame carried thereby and mounted for adjustment toward or away from each other, vertical guides attached to and extending downwardly from said bars, a plate mounted for vertical movements on said guides underneath each horizontal bar, a plurality of vertical fingers secured to and extending upwardly from each of said plates, a finger pivotally mounted and carried by each of said plates adjacent each end thereof, spring means normally tending to swing said pivotally mounted fingers outward at their upper ends, a rock shaft, arms extending from said rock shaft underneath said plates, a rod connecting the inner ends of said arms, means for rocking said shaft to raise and lower said rod, yielding connections between said rod and one of said pivotally mounted fingers for moving the same to vertical position on downward movement of said rod, means operated by the first of said pivotally mounted fingers for swinging the other of the pivotally mounted fingers to vertical position, hooks depending one from each of said plates with which said rod engages after a predetermined movement thereof in a downward direction to thereby move said plates and fingers downwardly, and spring means for normally elevating said plates to upper position when free to do so.

10. A construction containing the elements in combination defined in claim 9, combined with slotted guide plates permanently secured and extending upwardly adjacent the rear ends of said horizontal bars, a substantially vertical link connected to said rod adjacent each end thereof having a pin at its upper end extending through the slot of the adjacent guide plate, upwardly extending pivotally mounted links carried by the supporting frame at each side thereof adjacent said guide plates, elongated vertical plates mounted at the upper ends of the last mentioned links, and connections between said pins and said plates for moving the plates forwardly and downwardly on downward movement of said rod.

11. In a wrapping machine, a horizontal support on which elongated articles to be wrapped with a wrapper rolled longitudinally around the same and with end portions of the wrapper extending beyond the ends of the article may be placed, a supporting frame for said support, vertical guides carried by said frame extending below said horizontal support at each side of the machine, vertical plates slidably mounted on said guides for vertical movement, fingers mounted on and extending upwardly from said plates above the horizontal support at each side of the machine, rear locating means attached to and extending upwardly from said plates, pivotally mounted fingers carried by each of said plates one adjacent each end thereof, a rock shaft, arms extending to the rear from said rock shaft, a rod connecting the rear ends of the arms, means for rocking the shaft to raise and lower said rod, means between said rod and said fingers for moving said fingers toward each other at the beginning of the downward movement of the rod, hook devices carried by said plates with which said rod engages after a predetermined downward movement thereof to thereby move said plates, attached fingers and locating devices in a downward direction, horizontal folding plates located above and at the rear portions of said horizontal support, link connections between said folding plates and said support, connections between said end folding plates and said horizontal rod whereby on downward movement of the rod said end folding plates will move downwardly and forwardly and follow the said fingers in their downward movement, and spring actuated means serving to elevate said plates and fingers on upward movement of said rod.

12. In a wrapping machine, a supporting frame, horizontal flat bars one adjacent each side of the frame supported thereby, spaced apart vertical guides connected with and extending below said bars, a plate slidably mounted on said guides, one below each horizontal bar, pivotally mounted fingers carried by said plates adjacent each end thereof, each of said fingers adjacent its pivot having a laterally extending arm, a roller on each arm, a U-shaped stirrup mounted on each plate passing over one of said rollers and under the other, an operating bar secured to one of said fingers, a rock shaft, arms extending to the rear from said rock shaft, means for rocking the shaft, a rod connecting the rear end to said arms, a coiled spring connection between said rod and said operating bar, hook members depending from each plate with which the rod engages after it has made a predetermined downward movement, and spring actuated means acting to elevate said plates on upward movement of the rod.

13. In a wrapping machine, a supporting frame, horizontal supports at the upper sides of the frame on which an article is placed for wrapping, a lever pivotally mounted between its ends at one side of the frame extending upwardly and forwardly to the front thereof, a bar pivotally mounted at the opposite side of the frame and extending in the same direction, a horizontal rod connecting the upper forward ends of said lever and bar, trip actuated means for oscillating said lever about its pivot to carry the rod rearwardly over said horizontal supports and back to initial position, and means operated by said lever during the first part of its movement for folding the ends of a wrapper against the ends of the article to be wrapped, said rod acting to move the wrapped article to the rear end off of said horizontal support after the end folding has been performed.

14. In a wrapping machine, a frame, horizontal supports at the upper side of the frame on which an article with a wrapper rolled around the same lengthwise thereof and having projecting end portions of the wrapper extending beyond the ends of said article is to be placed, a lever pivotally mounted between its ends at one side of the frame extending upwardly and forwardly in front thereof, a horizontal rod connected to the upper end of the lever and extending transversely in front of the machine, a supporting bar connected to the opposite end of the rod pivotally mounted at the opposite side of the frame on an axis in alinement with the pivot of said lever, trip actuated means for swinging said lever from its forward position to the rear and back to initial position thereby carrying said rod rearwardly over said horizontal article supports, means for folding the projecting end portions of the wrapper against the ends of the article actuated by said lever during the initial portion of its rearward movement, means to automatically disconnect said lever from said wrapper end folding mechanism during the latter part of its rearward movement, and movable means located on said horizontal supports in front of the article wrapped with which the horizontal rod engages after the end folding operation on the wrapper has been completed to move the wrapped article to the rear off of said horizontal supports.

15. In a wrapping machine, a frame, horizontal supports at the upper side of the frame on which an article having a wrapper rolled around the same and located lengthwise thereof and with end portions of the wrapper projecting beyond the ends of the article may be placed, a lever pivotally mounted at one side of the support extending upwardly and forwardly to the front thereof, a horizontal rod secured to the upper end of the lever and extending across in front of the frame, a bar pivotally connected at the opposite side of the frame for supporting the other end of said rod, trip actuating means for oscillating the lever about its pivot to carry the horizontal rod rearwardly over the horizontal supports and back to initial position, a rock shaft, an arm extending from said rock shaft alongside said lever, a lateral rod at the upper end of said arm extending in front of the lever, a member attached to said lever adjacent its upper end having a short section extending downwardly at the outer side of said rod and thence curved outwardly and downwardly in an arc of a circle whose center is the pivotal axis of said lever, and thence extending back to the lever and secured thereto, mechanism operated by said rock shaft for folding the projecting end portions of the lever against the ends of the article placed on said horizontal supports, and devices movably mounted on said horizontal supports in front of the article wrapped against which the horizontal rod engages after the end folding operations on the wrapper have been completed to move the wrapped article rearwardly off of said supports and return the devices to inoperative position, thereby leaving the supports free to receive another article to be wrapped when the parts have returned to initial position.

16. In a wrapping machine, the combination of a support on which an article to be wrapped with a wrapper extending beyond the ends thereof may be placed, fingers extending upwardly at the ends of said support to turn the lower projecting end portions of said wrapper upwardly when the article with the wrapper thereabout is placed on the support, moving fingers adapted to fold the sides of the projecting ends of the wrapper, means for lowering all of said fingers, and additional means for folding the upper sides of the projecting end portions of the wrapper in a downward direction against the ends of the wrapper.

17. In a wrapping machine, a support onto which an article having a wrapper with projecting end portions may be placed, fingers extending upwardly above said support at each end thereof to engage with the underside of the projecting end portions of the wrapper and fold the same against the end of the article, means for thereafter folding the side portions of the projecting ends of said wrapper against the ends of the article, means for retracting said fingers and side folding means, means for simultaneously folding the upper sides of the projecting end portions of the wrapper against the ends of the wrapper, an oscillating member, means for moving said member to the rear and back to its initial position, and devices at the front of the wrapped article movably mounted on the support with which said member engages, whereby said devices are moved to the rear to thereby carry the wrapped article over and off said support.

18. In a wrapping machine, means for operating upon a wrapper to fold it against one end of an article to be wrapped, and a unit comprising vertical reciprocating means for operating upon the opposite end of the wrapper to fold it against the opposite end of said article, said unit being adjustable as a whole toward or from said first folding means.

19. In a wrapping machine, means for operating upon a wrapper to fold it against one end of an article to be wrapped, a unit comprising vertical reciprocating means for operating upon the opposite end of the wrapper to fold it against the opposite end of said article, plate means for supporting the unit and adjustable means for supporting the plate means whereby the unit may be adjusted axially and sidewise relative to the article.

In testimony whereof I affix my signature.

WILLIAM E. MILLER.